United States Patent
Bordoz et al.

(10) Patent No.: US 10,792,959 B2
(45) Date of Patent: *Oct. 6, 2020

(54) TIRE HAVING GREATER RESISTANCE TO UNSEATING

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Francis Bordoz, Clermont-Ferrand (FR); Pascal Pachoud, Clermont-Ferrand (FR); Lionel Maubre, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 539 days.

This patent is subject to a terminal disclaimer.

(21) Appl. No.: 15/514,363

(22) PCT Filed: Sep. 18, 2015

(86) PCT No.: PCT/EP2015/071394
§ 371 (c)(1),
(2) Date: Mar. 24, 2017

(87) PCT Pub. No.: WO2016/046069
PCT Pub. Date: Mar. 31, 2016

(65) Prior Publication Data
US 2017/0297382 A1   Oct. 19, 2017

(30) Foreign Application Priority Data
Sep. 24, 2014  (FR) .................. 14 59002

(51) Int. Cl.
| | | |
|---|---|---|
| *B60C 15/06* | (2006.01) | |
| *B60C 15/02* | (2006.01) | |
| *B60C 15/00* | (2006.01) | |

(52) U.S. Cl.
CPC ...... *B60C 15/0607* (2013.01); *B60C 15/0009* (2013.01); *B60C 15/0018* (2013.01);
(Continued)

(58) Field of Classification Search
CPC . B60C 15/0018; B60C 15/0009; B60C 15/00; B60C 15/02; B60C 15/024; B60C 15/0607; B60C 15/0632
(Continued)

(56) References Cited

U.S. PATENT DOCUMENTS 3,662,597 A   5/1972  DeGhetto
3,946,785 A *  3/1976  Powers ............... B60C 15/0018
                                          152/550 X
(Continued)

FOREIGN PATENT DOCUMENTS

EP   103 346   4/1983
EP   358 490   3/1990
(Continued)

*Primary Examiner* — Adrienne C. Johnstone
(74) *Attorney, Agent, or Firm* — Cozen O'Connor

(57) ABSTRACT

A tire comprises a bead having an axial width at the seat D comprising a circumferential reinforcing element (22) of which the radially innermost point (222) is at a radial distance Z and at an axial distance Y from the radially innermost point (211) of the bead, and such that Y/D is at least equal to 0.5 and Z/D is at most equal to 0.4. The end of the carcass reinforcement (311) is situated radially on the outside of the radially outermost point (223) of the circumferential reinforcing element. This same bead comprises at least one bead layer (23) surrounding the bead filler rubber (21) and such that its axially outermost end (231) is radially on the outside of the end (311) and such that its axially (Continued)

innermost end (232) is at least radially on the outside of the point (222).

17 Claims, 8 Drawing Sheets

(52) U.S. Cl.
CPC .......... *B60C 15/02* (2013.01); *B60C 15/0632* (2013.01); *B60C 2015/0614* (2013.01)

(58) Field of Classification Search
USPC ................................. 152/550, 551, 542, 552
See application file for complete search history.

(56) References Cited

U.S. PATENT DOCUMENTS

| | | | |
|---|---|---|---|
| 6,709,540 B1 | 3/2004 | Oare et al. | |
| 2018/0162179 A1* | 6/2018 | Bordoz | B60C 15/0018 |

FOREIGN PATENT DOCUMENTS

| | | |
|---|---|---|
| EP | 1 013 482 | 6/2000 |
| EP | 1 433 624 | 6/2004 |
| EP | 1 307 351 B1 | 3/2006 |
| EP | 2 455 237 | 5/2012 |
| FR | 2 443 341 | 7/1980 |
| WO | WO 2004/065141 | 8/2004 |

\* cited by examiner

10,792,959 B2

TIRE HAVING GREATER RESISTANCE TO UNSEATING

RELATED APPLICATIONS

This is a U.S. National Phase Application under 35 USC 371 of International Application PCT/EP2015/071394 filed on Sep. 18, 2015.

This application claims the priority of French application no. 1459002 filed Sep. 24, 2014.

FIELD OF THE INVENTION

The present invention relates to tires for any type of vehicle, more particularly low-pressure tires. What is meant by low pressure is, for example and nonexhaustively, a pressure of the order of 1.5 bar in the case of a passenger-vehicle tire, of 1.2 bar for a sporty passenger-vehicle tire and of 0.6 bar for an agricultural vehicle. This low pressure may be the result of a loss of sealing or the result of a deliberate choice made in order to obtain a particular performance, such as, for example, grip in the case of a sporty passenger vehicle.

A tire comprises a crown comprising a tread intended to come into contact with the ground via a tread surface, two beads intended to come into contact with a rim and two sidewalls connecting the crown to the beads.

BACKGROUND

The ease with which a tire becomes unseated, which means to say with which the bead of the tire moves around on, and then comes off the rim, which means to say becomes detached from the rim when a transverse load is applied to the tire, is one of the tire features important to the safety of the passengers of the vehicle.

Unseating is more particularly a problem for the following low-pressure tires:

tires for sporty vehicles where there is a desire to improve grip by having a contact patch that is increased by reducing the service pressure, agricultural vehicles where there is a desire to reduce the impact on the compaction of cultivated land by reducing the service pressure, passenger-vehicle tires which are designed to run for a few hundred kilometres following a loss of pressure.

For example, for passenger-vehicles, the standardization authorities have, with respect to unseating and tires coming off the rim, set target values to be achieved (such as, for example, in Chinese standard GB/T 2978-2008) and corresponding test methods (such as, for example, the method recommended in Chinese standard GB/T 4502-2009). An example of a test method is also described in patent U.S. Pat. No. 3,662,597, whereby a conical form is applied against a sidewall of the tire. The pressure applied to the sidewall is then increased and the sidewall movement is recorded. A similar test method has been adopted in "Federal Motor Vehicle Safety Standard No. 109" by the American federal road safety organisation the NHTSA (National Highway Traffic Safety Administration).

These increasingly demanding recommendations from the standardization authorities require these tires to be made even more resistant to unseating and to coming off their rims.

Conventionally, the resistance to unseating can be increased by bonding the tire to the mounting rim, although this solution has the disadvantage of making the tire very difficult to remove. It is also possible to modify the geometry of the tire and of the rim, as disclosed in documents EP103346 B1 or EP1307351 B1 or EP358490 A2, so as to make unseating more difficult, but this approach entails destandardizing the rim and sometimes expensive modifications to the moulds used to manufacture the tires.

Since a tire has a geometry exhibiting symmetry of revolution with respect to an axis of rotation, the geometry of the tire was generally described in a meridian plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane.

In what follows, the expressions "radially on the inside of" and "radially on the outside of" respectively mean "closer to the axis of rotation of the tire, in the radial direction, than" and "further from the axis of rotation of the tire, in the radial direction, than". The expressions "axially on the inside of" and "axially on the outside of" respectively mean "closer to the equatorial plane, in the axial direction, than" and "further away from the equatorial plane, in the axial direction, than". A "radial distance" is a distance with respect to the axis of rotation of the tire and an "axial distance" is a distance with respect to the equatorial plane of the tire. A "radial thickness" is measured in the radial direction, and an "axial width" is measured in the axial direction.

The expression "rubber compound" denotes a composition of rubber containing at least an elastomer and a filler.

SUMMARY OF THE INVENTION

One object of the present invention is to increase the resistance to unseating of a tire without making it more difficult to fit and to remove and without requiring modifications to the mounting rims conventionally used.

This and other objects are attained in accordance with one aspect of the invention directed to a tire intended to be mounted on a mounting rim, comprising:

two beads, which are intended to come into contact with the mounting rim, the mounting rim comprising a substantially radial portion or side and a substantially axial portion or seat, each bead having a radially innermost point positioned with respect to the side at an axial distance D referred to as the axial width at the seat and comprising at least one bead filler made up of at least one rubber composition and of at least one circumferential reinforcing element, the meridian section of the circumferential reinforcing element having a radially innermost point, a radially outermost point and an axially innermost point, the radially innermost point being positioned at a radial distance Z and at an axial distance Y from the radially innermost point of the bead, a carcass reinforcement connecting the two beads and comprising at least one carcass layer extending in each bead radially towards the inside as far as a carcass layer end, for at least one bead, the carcass layer end is positioned radially on the inside of the point of greatest axial width of the tire and axially on the outside of the axially innermost point of the circumferential reinforcing element, for the said bead, the ratio Y/D between the axial distance Y from the radially innermost point of the circumferential reinforcing element to the radially innermost point of the bead, and the axial width of the bead at the seat D, is at least equal to 0.5, for the said bead, the ratio Z/D between the radial distance Z from the radially innermost point of the circumferential reinforcing element to the radially innermost point of the bead, and the axial width of the bead at the seat D, is at most equal to 0.4, in the said bead, any part of any arbitrary carcass layer of the carcass reinforcement radially inside of the radially outermost point of the circumferential reinforcing element is axially on the outside of the radially innermost point of the circumferential reinforcing element, the said bead comprises a bead reinforcement, made up of at least one bead layer, which surrounds the bead filler in such a way that the axially outermost end of the bead layer is radially on the outside of the radially innermost end of the carcass layer and such that the axially innermost end of the bead layer is at least radially on the outside of the radially innermost point of the circumferential reinforcing element, for the said bead comprising an external face, the points on the bead reinforcement which are positioned radially on the inside of the radially innermost point of the circumferential reinforcing element are positioned, with respect to the external face of the bead, at a distance, measured perpendicular to the external face of the bead, that represents at most Z/2, half the radial distance between the radially innermost point of the bead and the radially innermost point of the circumferential reinforcing element, for the said bead, the bead filler portion at least radially on the inside of the radially innermost point of the circumferential reinforcing element, has an elastic modulus at 10% elongation at least equal to 15 MPa.

For a tire with a set direction of mounting, one possible solution is to apply the invention to just one of the beads, the one positioned on the outboard side. This is because the bead situated on the inboard side is subjected either to a load that is very light because of the load transfers of the vehicle under cornering or is subjected to a load that opposes unseating.

In the bead according to the prior art, unseating occurs under a lateral load applied to the crown which pulls on the carcass layer passing under the circumferential reinforcing element, which becomes unseated from the rim. The main force opposing this load is the internal pressure of the tire. In the case of tires that are not highly inflated, this force may prove insufficient depending on the transverse load applied and particularly in the case of sporty vehicles which run at speeds at the limit of grip of the tires, or vehicles that are heavily laden.

In order to increase the lateral load that opposes unseating, a person skilled in the art arranges, on the inside of the radially innermost point of the radially innermost carcass layer, a wedge of rubbery material known as a bead toe. Using this solution, he increases the axial width D of the bead at the seat. This bead toe by friction opposes unseating. The point of contact between the bead toe and the rim becomes the pivot point about which the bead moves. With this geometry, unseating occurs when the circumferential reinforcing element passes axially beyond the pivot point after having compressed the materials situated between the bead toe and the circumferential reinforcing element.

The axial width of the bead at the seat D is the axial distance between the radially innermost point of the bead and the point of connection between the seat and the side of the bead. The point of connection between the seat and the side of the bead is the point of intersection of the two straight lines of the meridian plane, tangential to the contour of the tire; a first tangential straight line in the external axial projection of the radially innermost point of the circumferential reinforcing element, the second tangential straight line in the interior radial projection of the axially outermost point of the circumferential reinforcing element. The axial width of the bead at the seat D is usually measured on a meridian cross section of the tire, obtained by sectioning the tire along two meridian planes. By way of example, a meridian section of tire has a thickness in the circumferential direction of around 60 mm at the tread. The measurement is taken keeping the distance between the two beads identical to that of the tire mounted on its rim and lightly inflated.

For a given inside diameter of the circumferential reinforcing element, the greater the distance between the bead toe and the circumferential reinforcing element, the greater the unseating load. According to an embodiment of the invention, positioning the radially innermost point of the circumferential reinforcing element at a radial distance Z and at an axial distance Y away from the radially innermost point of the bead and such that Y/D is at least equal to 0.5 and Z/D is at most equal to 0.4 makes it possible to guarantee a minimal unseating load, this being with the proviso that the material situated between these two points is sufficiently rigid. As a result, the portion of bead filler radially on the inside of the radially innermost point of the circumferential reinforcing element needs to have an elastic modulus greater than or equal to 15 MPa.

One solution for increasing the compression rigidity of this said bead filler portion is to oppose the induced transverse deformation, which in the case of rubbery materials is great. The solution proposed in accordance with one embodiment of the invention is to surround all of this bead filler portion with at least one layer of textile reinforcers, which are parallel to one another and limit this deformation. This layer of textile reinforcers is referred to as a bead layer and the assembled collection of these layers is referred to as the bead reinforcement.

In order to limit the movements of the circumferential reinforcing element produced by the tension of a carcass layer upon unseating, an embodiment of the invention excludes any part of a carcass layer that would under tension increase a deformation of the circumferential reinforcing element in favour of unseating, so that any part of any arbitrary carcass layer of the carcass reinforcement radially on the inside of the radially outermost point of the circumferential reinforcing element is axially on the outside of the radially innermost point of the circumferential reinforcing element.

In order to best limit the induced transverse deformations, it is appropriate for the bead layer to be as far towards the outside of the bead as possible without, however, being in contact with the rim where friction phenomena occur that could damage the reinforcers and render them unable to perform the desired function. In addition, it is absolutely essential that there be a layer of compound between the radially innermost point of the circumferential reinforcing element and the bead layer in order easily to absorb the passage over the hump on mounting. Because the tire seat is a near-axial straight line; and because the distance between the exterior face and the bead layer is less than Z/2, the layer of rubbery material between the radially innermost point of the circumferential reinforcing element and the bead layer is close to Z/2.

Rubbers specially designed to withstand friction over a thickness up to Z/2, which is half the radial distance between the radially innermost point of the bead and the radially innermost point of the circumferential reinforcing element, can be used to protect the bead layer from this wearing phenomenon. The thickness of these rubbers affording protection against wear needs to be minimized because these rubbers are more compressible than the bead filler compound and that correspondingly reduces the effectiveness of the invention. According to an embodiment of the invention, for the said bead which comprises an external face, the points on the bead reinforcement which are positioned radially on the inside of the radially innermost point of the circumferential reinforcing element are, with respect to the external face of the bead, at a maximum distance at most equal to Z/2, half the radial distance Z between the radially innermost point of the bead and the radially innermost point of the circumferential reinforcing element, so as to provide effective opposition against the unseating loads.

In order to guarantee the geometry and notably the position of the bead reinforcement with respect to the external face of the bead for the part radially on the inside of the radially innermost point of the circumferential reinforcing element, it is necessary to eliminate the movements of the bead filler rubber that are caused by the loads applied to the carcass reinforcement during the moulding of the tire. The solution proposed is to eliminate the presence of the carcass reinforcement in the bead and to secure the bead and the sidewall via a zone referred to as a region of overlap between the carcass reinforcement and the bead reinforcement.

In addition, in order for the carcass reinforcement to perform its function of connection with the crown, its end is situated radially on the inside of the point of widest axial cross section of the tire. The maximum axial width of the tire is measured at the sidewalls, with the tire mounted on its rim and lightly inflated, namely inflated to a pressure equal to 10% of the nominal pressure as recommended, for example, by the Tire and Rim Association or TRA.

The connection between the bead and the sidewall is via a zone referred to as region of overlap of the bead layer and of the carcass layer and therefore such that the end of the axially outermost bead layer is radially on the outside of the end of the radially innermost carcass layer.

The connection between the bead and the sidewall is through the shearing of the materials, generally rubber materials, situated between the reinforcing elements of the bead layer and of the carcass layer, referred to as shear rubber. The thickness of these said shear rubbers and the length of the overlap determine the balance of performance between lateral rigidity and durability of the tire. For a tire operating at low pressure, the length of this region of overlap is greater than 10 mm for minimal shear rubber thicknesses greater than 0.3 mm and less than 2 mm. For greater durability, one solution is to have a length of overlap in excess of 20 mm.

The circumferential reinforcing element may be produced either using metal reinforcing elements or using textile reinforcing elements wound in a spiral or braided together.

In one preferred embodiment, the radially innermost point of the circumferential reinforcing element is at an axial distance Y from the radially innermost point of the bead such that the ratio (Y/D) of this said axial distance (Y) to the axial width of the bead at the seat (D) is at most equal to 0.75. This is because it is necessary not to place the circumferential reinforcing elements in contact with the bead layer in order not to cause wearing of their constituent parts through friction, and not to cause cracking of the rubber composition of the bead filler through shear as a result of an excessively small thickness of this material between the two reinforcing elements that are the bead layer and the circumferential reinforcing element.

For these same reasons, in order to offset the risks of wearing of the reinforcing elements or of cracking of the bead filler at the seat, it is particularly advantageous for the radially innermost point of the circumferential reinforcing element to be situated at a radial distance (Z) from the radially innermost point of the bead such that the ratio (Z/D) of this said radial distance (Z) to the axial width of the bead at the seat (D) is at least equal to 0.25.

According to an embodiment of the invention, the carcass layer in which the overlap occurs may be either axially on the inside or on the outside of the bead layer participating in the overlap.

Depending on the number of carcass layers in the carcass reinforcement and of bead layers in the bead reinforcement, it is possible either to restrict the solution to a single length of overlap between two layers of each of the reinforcements or to multiply the lengths of overlap by alternating a carcass layer and a bead layer or a bead layer, two carcass layers, a bead layer. It is possible to bring the bead layer all the way up to just below the crown. This solution makes it possible to increase the rigidity of the sidewalls of the tire in order to meet vehicle dynamic response criteria. However, to do that, the carcass layer or layers absolutely must be able to react all of the tension in the radial direction associated with the inflating of the tire. Those skilled in the art have, for this purpose, well known solutions, such as, for example, the geometry and modulus of the reinforcers that make up the carcass layer compared with those that make up the bead layer.

In order to make the tire easier to produce, one preferred embodiment is such that the end of the carcass layer (311) is positioned radially on the outside of the radially outermost point (223) of the circumferential reinforcing element (22).

Advantageously, the reinforcing elements of a bead layer are made of textile, such as aliphatic polyamides, aromatic polyamides or a combination of aliphatic polyamides and of aromatic polyamides, polyethylene terephthalates, rayon, because they easily adapt to the various bead geometries.

It is also advantageous for the reinforcing elements of a carcass layer to be made of metal or of textile, such as aliphatic polyamides, aromatic polyamides or a combination of aliphatic polyamides and of aromatic polyamides, polyethylene terephthalates, rayon, depending on the service pressure of the tire. For tires with a service pressure of below 1.5 bar, carcass reinforcements with reinforcing elements made of textile are often preferred on account of their low weight and ease of use. For tires with a service pressure of above 1.5 but with an extended mode anticipating use with a pressure of below 1.5 bar, the carcass reinforcements with reinforcing elements made of metal are often preferred on account of their compression and fatigue strength.

According to one particular embodiment, the reinforcing elements of the carcass layer are parallel to one another and make with the circumferential direction an angle of between 65° and 115°, for well-known rolling-resistance and comfort performance.

Two reinforcing elements are said to be "parallel" in this document when the angle formed between the two elements is less than or equal to 5°.

According to one preferred embodiment, a bead layer comprises reinforcing elements that are parallel to one another and make with the circumferential direction an angle of between 20° and 160°, allowing an advantageous compromise between circumferential rigidity to limit wear upon contact with the mounting rim and flexural rigidity to limit deformation around the rim flange, which is a source of a great deal of energy dissipation given the significant volume of rubber present in the bead. Moreover, the choice of the angle of the bead layer depends on the rigidities that the tire designer wishes to obtain, notably in order to meet vehicle dynamic criteria. The radial position of the ends of the bead layers is also an advantageous parameter in setting the structural rigidities of the tire.

For preference, the bead filler portion radially on the outside of the radially outermost point of the circumferential reinforcing element has an elastic modulus at 10% elongation less than 0.5 times the elastic modulus at 10% elongation of the bead filler portion at least radially on the inside of the radially innermost point of the circumferential reinforcing element so as to encourage bending on the sidewall with respect to the bead and thus limit the dissipation of energy.

With this same objective of limiting the dissipation of energy during running and to facilitate manufacture, it may be preferable for the bead filler portion axially on the outside of the radially outermost point of the circumferential reinforcing element to have an elastic modulus at 10% elongation less than 0.5 times the elastic modulus at 10% elongation of the bead filler portion at least radially on the inside of the radially innermost point of the circumferential reinforcing element.

The mounted assembly comprising at least a wheel and a tire according to an embodiment of the invention operates even better if it comprises a wheel possessing at least one hump the height of which is greater than 1 mm. The hump makes it possible to block axial movement of the bead toe in the event of lateral load and prevents any slippage of the point of contact between the bead toe and the rim thus forcing the bead to move around this. The hump is a term known to those skilled in the art and denotes a "bump" on the bead seating surface of a wheel rim. Rims for passenger vehicle tires are very often equipped with a hump.

BRIEF DESCRIPTION OF THE DRAWINGS

The features and other advantages of the invention will be better understood with the aid of FIGS. 1 to 12, the said figures not being drawn to scale but in simplified form, in order to make the invention easier to understand:

FIG. 9 notably illustrates the distances Y and Z and the axial width of the bead at the seat D.

DETAILED DESCRIPTION OF THE DRAWINGS

Figure 1:
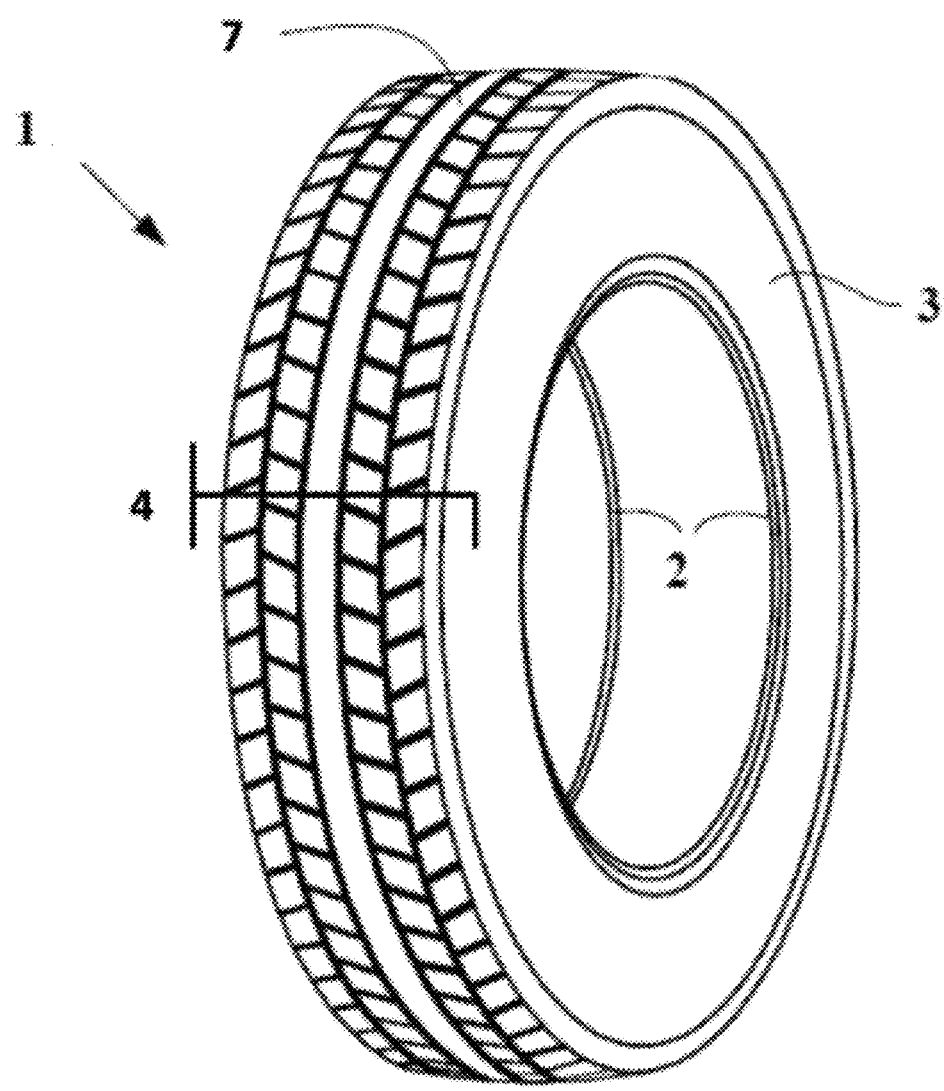
FIG. 1 depicts a tire according to the prior art.

FIG. 1 schematically depicts a tire 1 according to the prior art. The tire 1 comprises a crown 4 comprising a crown reinforcement (not visible in the figure) surmounted by a tread 7, two sidewalls 3 extending the crown radially inwards, and two beads 2 radially on the inside of the sidewalls 3.

Figure 2:
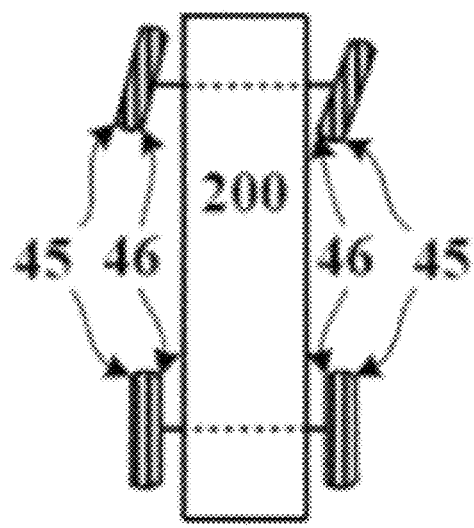
FIG. 2 illustrates the terms "inboard edge" and "outboard edge" of a tread.

FIG. 2 schematically depicts tires intended to be mounted on mounting rims of wheels of a vehicle 200 and having a set direction of mounting on the vehicle. It comprises an outboard axial edge 45 and an inboard axial edge 46, the outboard axial edge 46 being the edge intended to be mounted on the side of the body shell of the vehicle when the tire is mounted on the vehicle according to the said predetermined direction of mounting and the reverse in the case of the outboard axial edge 45. In the document the "outboard side" refers to the outboard axial edge 45.

Figure 5:
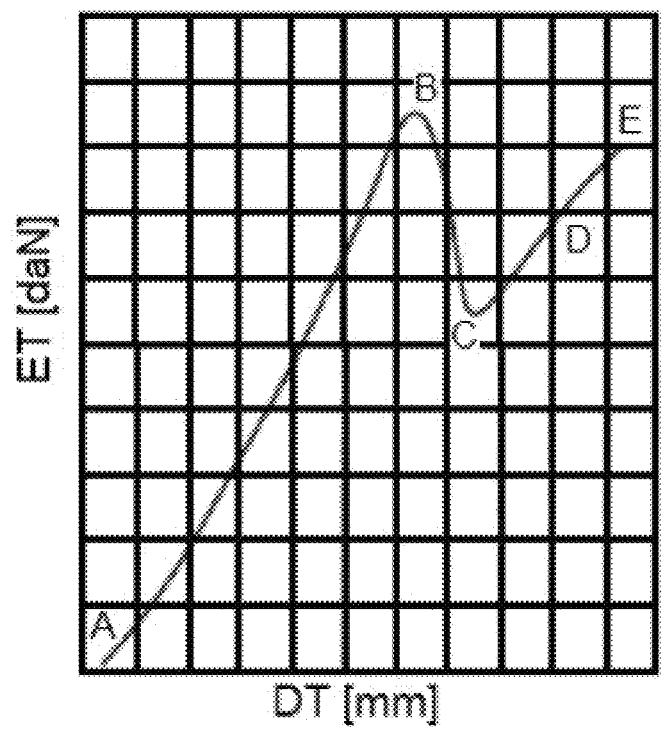

The graph depicted in FIG. 5 shows the result of a numerical simulation of an unseating test in accordance with Chinese standard GB/T 4502-2009. A conical form is applied against the sidewall of the tire. This conical form advances at a set rate. The load ET required to make the conical form advance at this rate is plotted as a function of the movement DT of the conical form.

Figure 3:
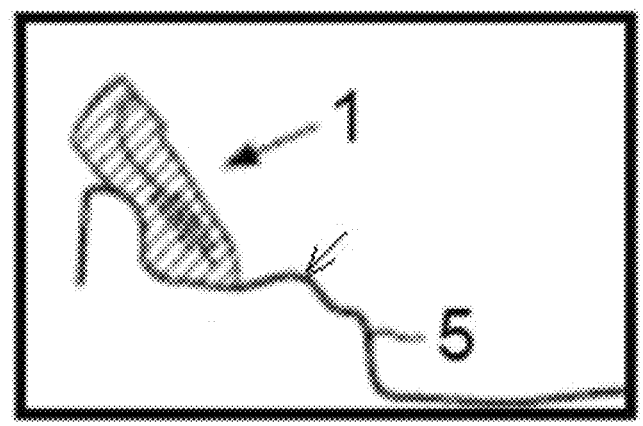
FIGS. 3 to 8 depict the movement of the sidewall of a tire as a function of the load applied to the tire sidewall during an unseating test.

The initial situation of the tire 1 (only the bead and part of the sidewall of which have been depicted) on its mounting rim 5 is depicted in FIG. 3. The initial condition depicted in FIG. 3 corresponds with A on the graph of FIG. 5.

Figure 4:
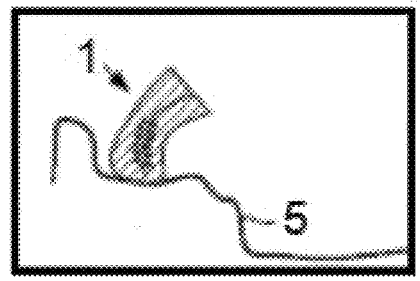
Figure 6:
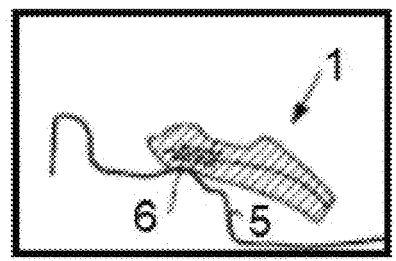
Figure 7:
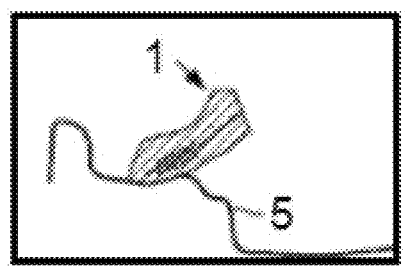
Figure 8:
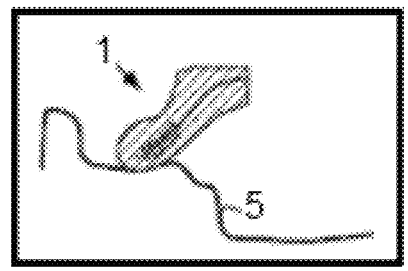

As the conical form moves, the resistance of the tire is manifested in the near-linear increase in the load ET. The bead begins to move up to the point at which it begins to tilt. This is the situation depicted in FIG. 4. The condition depicted in FIG. 4 corresponds with B on the graph of FIG. 5. This tilting causes a drop in the load required to cause the conical form to advance, until the bead has completely tilted, as is depicted in FIG. 8. The condition depicted in FIG. 8 corresponds with C on the graph of FIG. 5. The load then increases again because now the bead has to be made to rise over the hump 6 of the mounting rim 5, as illustrated in FIG. 7. The initial depicted in FIG. 7 corresponds with D on the graph of FIG. 5. It is only when the bead has overcome the hump 6 (situation depicted in FIG. 6) that unseating is complete. The condition depicted in FIG. 6 corresponds with E on the graph of FIG. 5.

Figure 9:
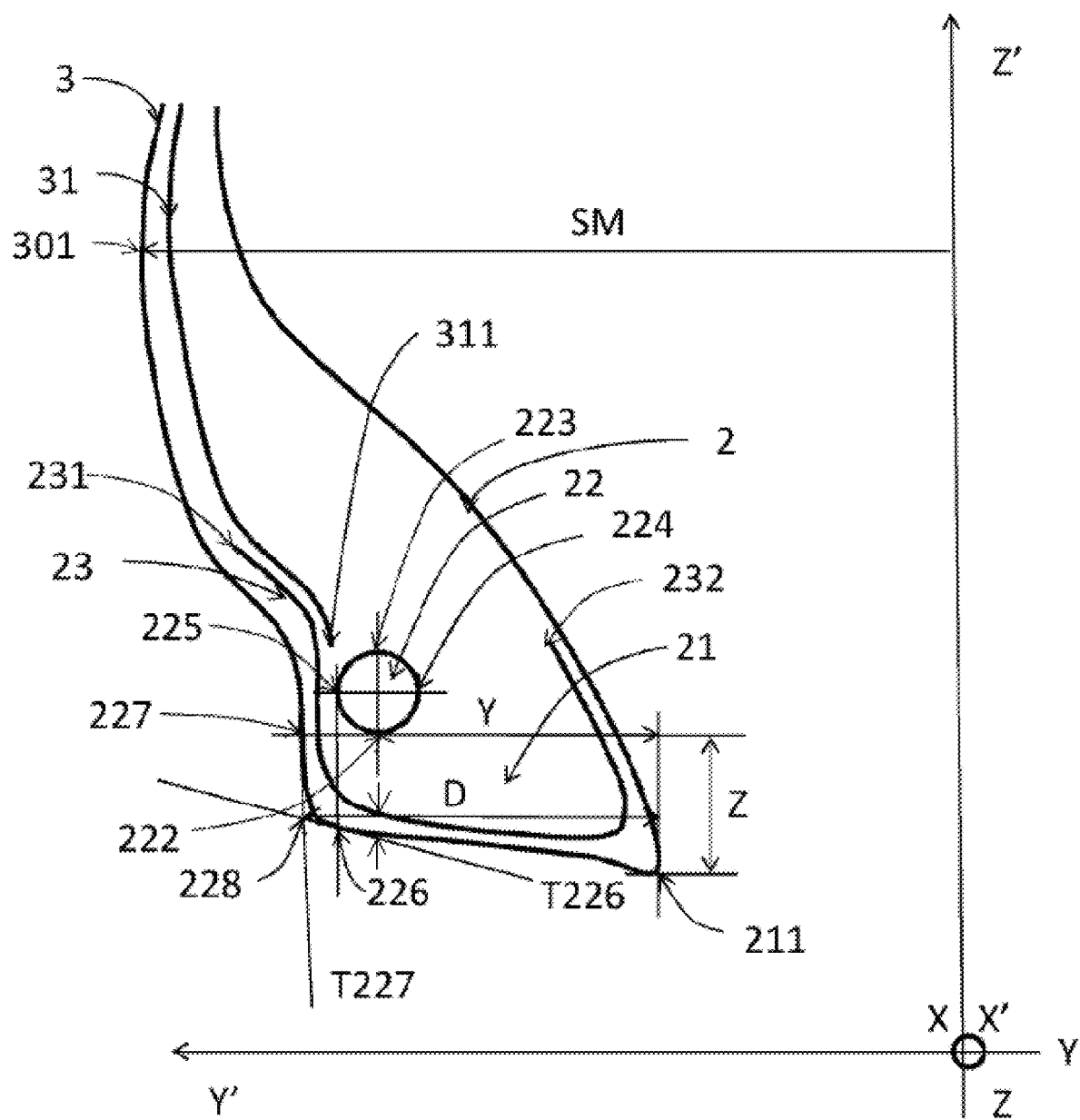
FIG. 9 depicts a meridian section through the bead and sidewall according to the invention.

FIG. 9 schematically depicts the meridian cross section of a bead 2 and of part of the sidewall 3 according to the invention. The tire 1 comprises two beads 2 intended to come into contact with a mounting rim (not depicted). At least the bead 2 and the sidewall 3 positioned on the outboard side (cf. FIG. 2) comprise:

a circumferential reinforcing element 22 of which the radially innermost point 222 is placed a radial distance Z away from the radially innermost point 211 of the tire and an axial distance Y away from this same point, a carcass reinforcement comprising at least one carcass layer 31 of which the end 311 is situated radially on the outside of the radially outermost point 223 of the circumferential reinforcing element 22 and radially on the inside of the point 301 of greatest width of the tire. The end 311 of the carcass layer is also axially on the outside of the axially innermost point 224 of the circumferential reinforcing element, a bead reinforcement comprising at least one bead layer 23 of which the axially outermost end 231 is radially on the outside of the end 311 of the carcass layer 31 and of which the axially innermost end 232 is radially on the outside of the radially innermost point 222 of the circumferential reinforcing element, the axially outermost point 225 of the circumferential reinforcing element 22 and its interior radial projection 226 onto the contour of the tire and the tangent T226 to the contour of the tire at this point 226 or seat of the bead, the radially innermost point 222 of the circumferential reinforcing element and its external axial projection 227 onto the contour of the tire and the tangent T227 to the contour of the tire at this point 227 or side of the bead, the intersection of these 2 tangents T226 and T227 at the point 228, the point at which the seat and the side of the bead meet, the axial width of the bead at the seat D, equal to the axial distance between the radially innermost point 211 and the point 228 at which the seat and the side of the bead meet.

The bead 2 depicted in FIG. 9 further comprises a portion intended to come into contact with the mounting rim (not depicted).

Figure 10:
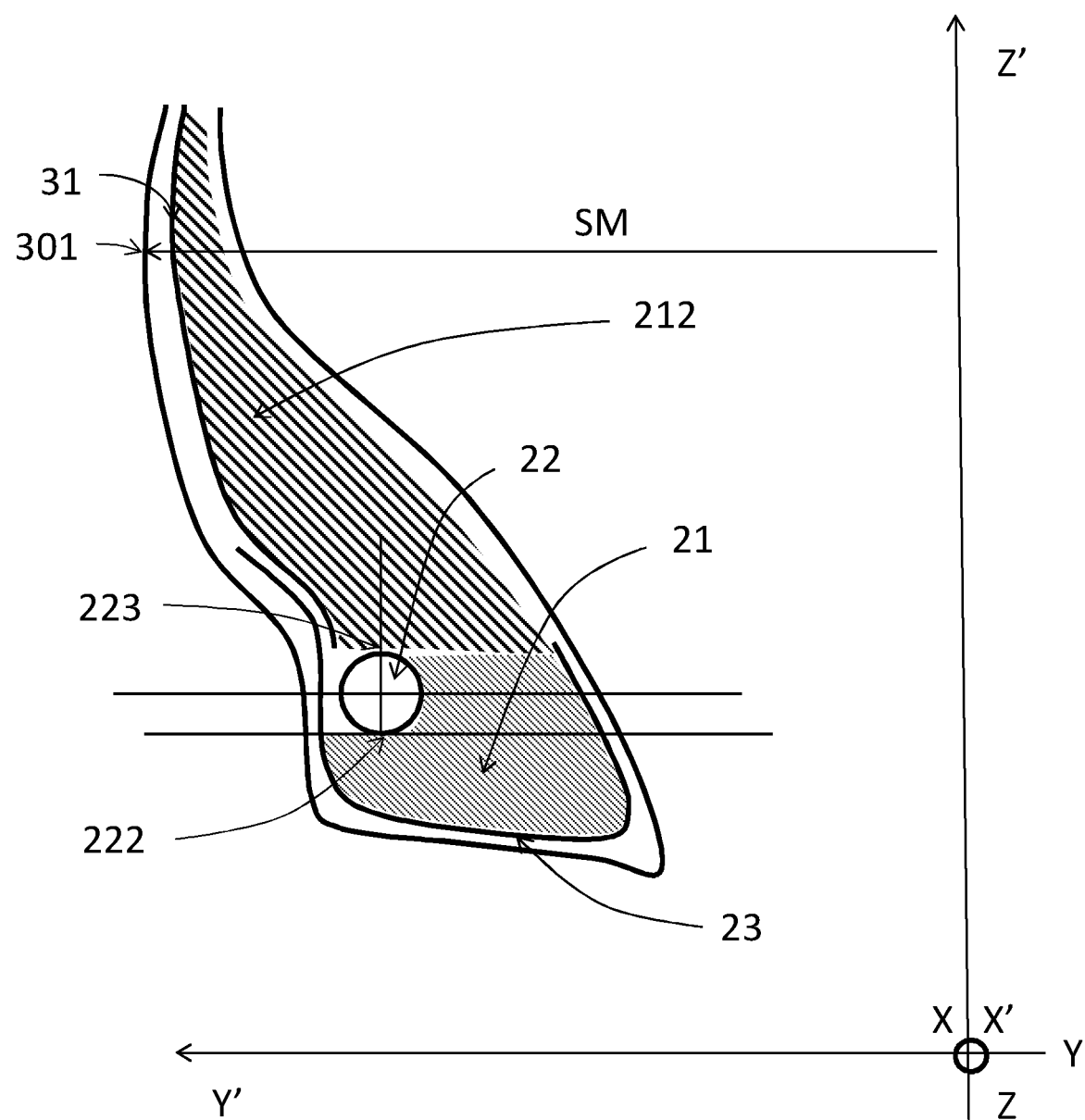
FIGS. 10 and 11 depict a meridian section of the bead and of the sidewall according to an embodiment of the invention, and preferred distributions of the bead filler rubber.
Figure 11:
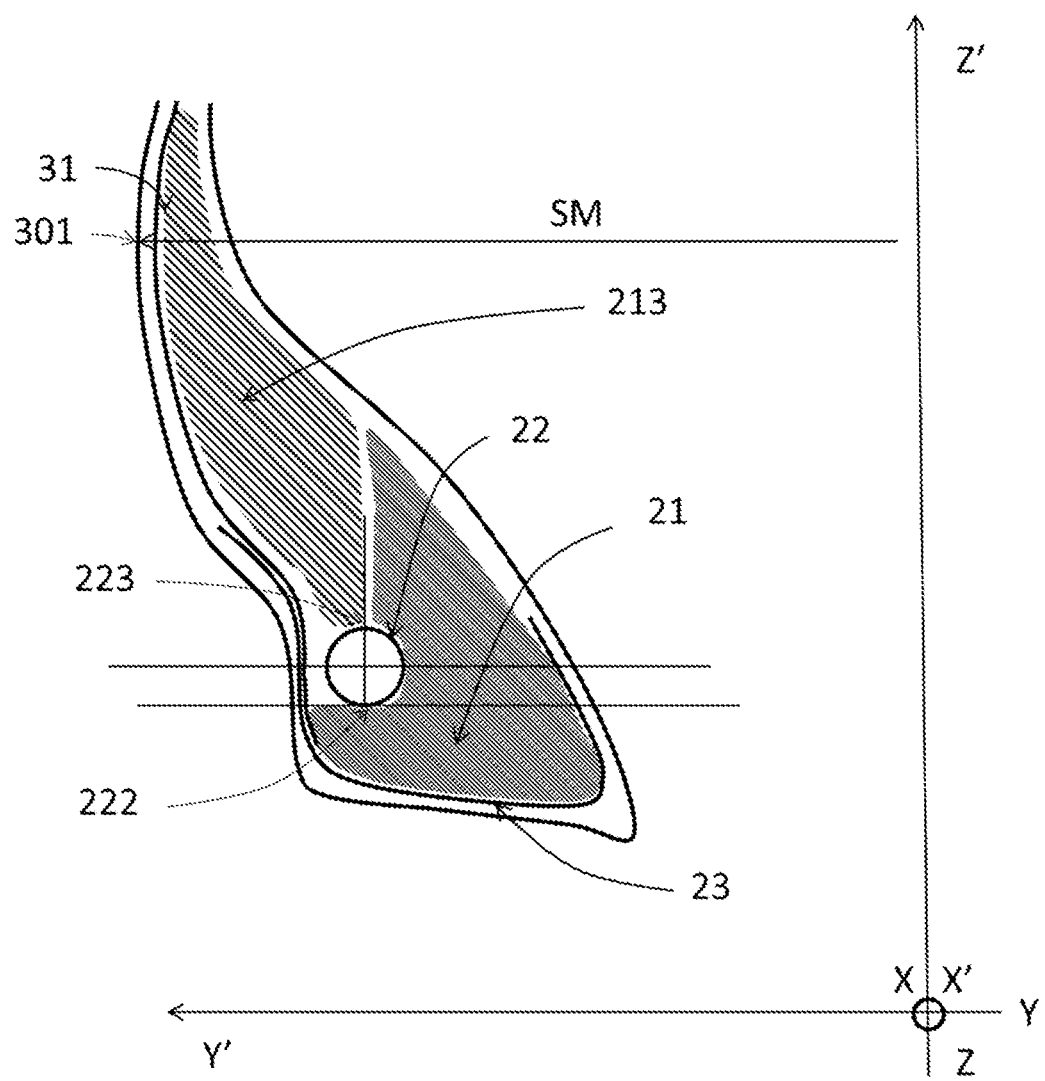

FIGS. 10 and 11 illustrate the various preferred configurations of the portions of bead filler 21, 212 and 213. The bead filler portion 21 is at least radially on the inside of the radially innermost point 222 of the circumferential reinforcing element 22. The bead filler portion 212 is radially on the outside of the radially outermost point 223 of the circumferential reinforcing element (FIG. 10). The bead filler portion 213 axially on the outside of the point 223 (FIG. 11).

Figure 12:
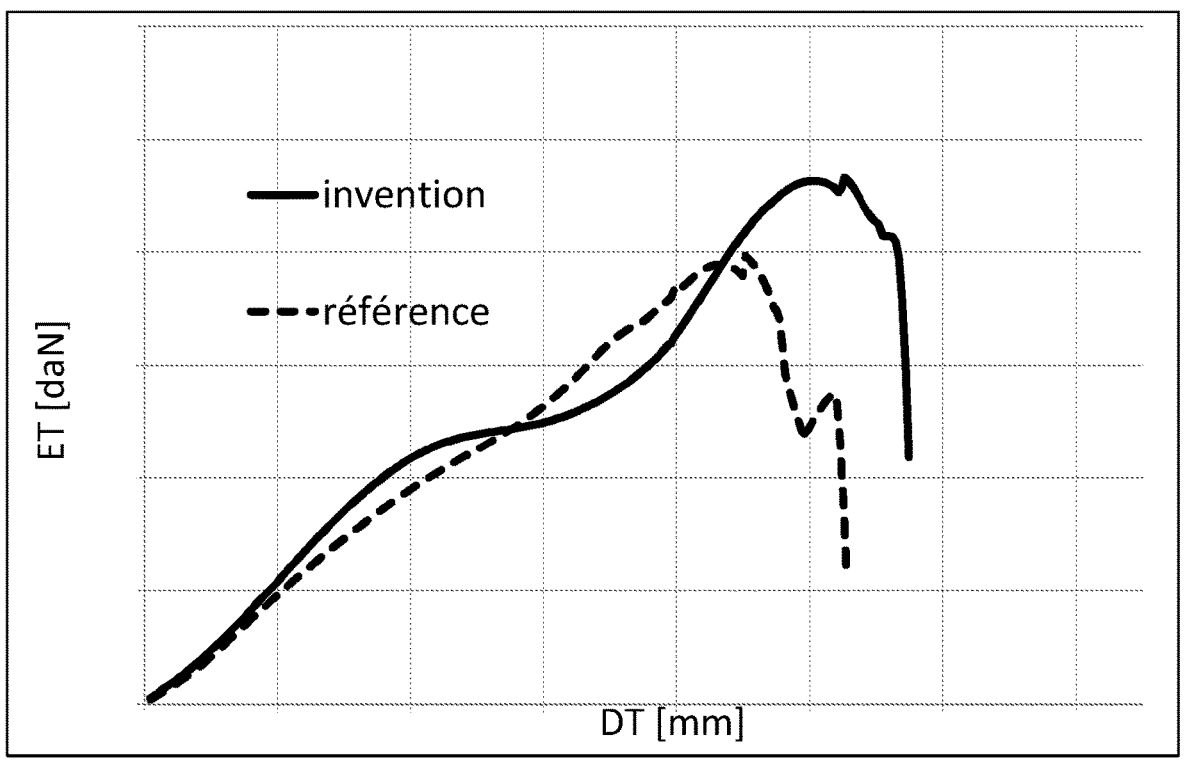
FIG. 12 depicts the movements of the sidewalls of a tire according to an embodiment of the invention and of a tire according to the prior art as a function of the load applied to the sidewall of the tires during an unseating test.

FIG. 12 shows the load ET required to cause the conical form of the unseating test according to Chinese standard GB/T 4502-2009 to advance as a function of the movement DT of the conical form between a tire according to the invention and a tire according to the prior art. The gain afforded by the invention in terms of causing unseating to occur is measured in terms of load between the maxima of the two curves on the ordinate axis and, in terms of movement, between the abscissa values for these two maxima.

The inventors carried out the invention on a tire of size 335/30_ZR_18, having a carcass reinforcement made up of two carcass layers of polyester making an angle of +/−85° with the radial direction, a bead layer made of aramid making an angle of 55° with the radial direction, a circumferential reinforcing element made up of braided metal cords with a cross section of 10.6 mm$^2$, the elastic modulus at 10% elongation of the bead filler 21 is equal to 54 MPa and that of the bead filler 213 to 23 MPa. The positioning of the circumferential reinforcing element is such that Y=8.5 mm, Z=5 mm, D=15.5 mm, Y/D=0.55, Z/D=0.33. The length of overlap between the carcass layer and the bead layer is equal to 25 mm; the radial position of the end of the carcass layer is equal to the radial position of the radially outermost point of the circumferential reinforcing element; the mean thickness of the protective rubber of the bead toe is 1.5 mm, the thickness of rubber between the bead layer and the radially innermost point of the circumferential reinforcing element is 3 mm.

By comparison with the anterior solution 335/30_ZR_18 with a carcass reinforcement made up of two carcass layers of polyester making an angle of +/−85° with the radial direction, a circumferential reinforcing element of braided metal cords with a cross section of 17 mm$^2$, a bead wire filler the elastic modulus of which is equal to 23 MPa, and a bead toe the elastic modulus at 10% elongation of which is equal to 23 MPa; the positioning of the circumferential reinforcing element is such that Y=7 mm, Z=8 mm, D=16 mm, Y/D=0.43, Z/D=0.5. The mechanical connection between the bead and the carcass is achieved by turning the carcass up around the circumferential reinforcing element. The test method is similar to the one recommended in Chinese standard GB/T 4502-2009. The test is performed at a pressure of 0.7 bar. The load needed to cause unseating in the test is increased by 18%, the sidewall movement is increased by 19% when the pressure needed to negotiate the humps of the rim during mounting is reduced by 50% thus demonstrating that ease of mounting is not only preserved but also improved.

The bead reinforcement also performs a protective function; any damage to the said reinforcement remains localized and has no impact on the durability of the carcass reinforcement.

The invention claimed is:

1. A tire capable of being mounted on a mounting rim, comprising:

two beads, which are capable of coming into contact with the mounting rim, each bead comprising an axially outer side and a radially inner seat;

each said bead in meridian cross-section having a radially innermost point positioned with respect to the side at an axial distance D, referred to as the axial width at the seat, and comprising a bead filler, made up of at least one rubber composition, and a circumferential reinforcing element;

the meridian cross-section of the circumferential reinforcing element having a radially innermost point, a radially outermost point and an axially innermost point, the radially innermost point being positioned at a radial distance Z and an axial distance Y from the radially innermost point of the bead;

a carcass reinforcement connecting the two beads and comprising a carcass layer extending in each said bead radially towards the inside as far as a carcass layer end;

for at least one said bead, the carcass layer end is positioned radially on the inside of a point of greatest axial width of the tire and axially on the outside of the axially innermost point of the circumferential reinforcing element, wherein, for each of the at least one said bead, the ratio Y/D between the axial distance Y from the radially innermost point of the circumferential reinforcing element to the radially innermost point of the bead, and the axial width of the bead at the seat D, is greater than or equal to 0.5, wherein, for each of the at least one said bead, the ratio Z/D between the radial distance Z from the radially innermost point of the circumferential reinforcing element to the radially innermost point of the bead, and the axial width of the bead at the seat D, is less than or equal to 0.4, wherein, in each of the at least one said bead, every part of the carcass reinforcement radially inside of the radially outermost point of the circumferential reinforcing element is axially on the outside of the radially innermost point of the circumferential reinforcing element, wherein, each of the at least one said bead comprises a bead reinforcement, comprising a bead layer, surrounding the bead filler in such a way that the axially outermost end of the bead layer is radially on the outside of the radially innermost end of the carcass layer and such that the axially innermost end of the bead layer is radially on the outside of the radially innermost point of the circumferential reinforcing element, wherein, for each of the at least one said bead, the bead reinforcement is close to but not contacting the external surface of the bead such that the points on the bead reinforcement which are positioned radially on the inside of the radially innermost point of the circumferential reinforcing element are positioned, with respect to the closest portion of the external surface of the bead, at a distance, measured perpendicular to the external surface of the bead, that is less than or equal to Z/2, half the radial distance Z between the radially innermost point of the bead and the radially innermost point of the circumferential reinforcing element, and wherein, for each of the at least one said bead, the bead filler comprises a bead filler portion at least partially radially on the inside of the radially innermost point of the circumferential reinforcing element, the bead filler portion being made up of a rubber composition and having an elastic modulus at 10% elongation E21 greater than or equal to 15 MPa.

2. The tire according to claim 1, wherein, for each of the at least one said bead, the ratio Y/D between the axial distance Y from the radially innermost point of the circumferential reinforcing element to the radially innermost point of the bead, and the axial width of the bead at the seat D is less than or equal to 0.75.

3. The tire according to claim 1, wherein, for each of the at least one said bead, the ratio Z/D between the radial distance Z from the radially innermost point of the circumferential reinforcing element to the radially innermost point of the bead, and the axial width of the bead at the seat D is greater than or equal to 0.25.

4. The tire according to claim 1, wherein, for each of the at least one said bead, the axially outermost end of the bead layer is radially on the outside of the radially innermost end of the carcass layer by a difference in radius greater than or equal to 10 mm.

5. The tire according to claim 1, wherein, for each of the at least one said bead, the axially outermost end of the bead layer is axially on the outside of the radially innermost end of the carcass layer.

6. The tire according to claim 1, wherein, for each of the at least one said bead, the axially outermost end of the bead layer is axially on the inside of the radially innermost end of the carcass layer.

7. The tire according to claim 1, wherein, for each of the at least one said bead, the radially innermost end of the carcass layer is positioned radially on the outside of the radially outermost point of the circumferential reinforcing element.

8. The tire according to claim 1, wherein, for each of the at least one said bead, the bead layer is a layer of reinforcing elements, adjacent ones of the bead layer reinforcing elements either being parallel to one another or forming between them an angle of less than or equal to 5°, the reinforcing elements of the bead layer are made of textile.

9. The tire according to claim 1, wherein the carcass layer is a layer of reinforcing elements and the reinforcing elements of the carcass layer are made of metal or of textile.

10. The tire according to claim 1, wherein the carcass layer is a layer of reinforcing elements and the reinforcing elements of the carcass layer are parallel to one another or form between them an angle of less than or equal to 5°, the reinforcing elements of the carcass layer making with the circumferential direction an angle of between 65° and 115°.

11. The tire according to claim 1, wherein, for each of the at least one said bead, the bead layer is a layer of reinforcing elements, adjacent ones of the bead layer reinforcing elements either being parallel to one another or forming between them an angle of less than or equal to 5°, the reinforcing elements of the bead layer making with the circumferential direction an angle of between 20° and 160°.

12. The tire according to claim 1, wherein, for each of the at least one said bead, the bead filler portion abuts a second bead filler portion made up of a second rubber composition and positioned radially on the outside of the radially outermost point of the circumferential reinforcing element, and the second bead filler portion radially on the outside of the radially outermost point of the circumferential reinforcing element has an elastic modulus at 10% elongation E212 less than 0.5 times the elastic modulus at 10% elongation E21 of the bead filler portion at least partially radially on the inside of the radially innermost point of the circumferential reinforcing element.

13. The tire according to claim 1, wherein, for each of the at least one said bead, the bead filler portion abuts a second bead filler portion made up of a second rubber composition and positioned axially on the outside of the radially outermost point of the circumferential reinforcing element, and the second bead filler portion axially on the outside of the radially outermost point of the circumferential reinforcing element has an elastic modulus at 10% elongation E213 less than 0.5 times the elastic modulus at 10% elongation E21 of the bead filler portion at least partially radially on the inside of the radially innermost point of the circumferential reinforcing element.

14. An assembly comprising a tire according to claim 1 mounted on a wheel possessing, for each of the at least one said bead, a hump the height of which is greater than or equal to 1 mm.

15. The tire according to claim 1, wherein, for each of the at least one said bead, the axially outermost end of the bead layer is radially on the outside of the radially innermost end of the carcass layer by a difference in radius greater than or equal to 20 mm.

16. The tire according to claim 1, wherein, for each of the at least one said bead, the bead layer is a layer of reinforcing elements, adjacent ones of the bead layer reinforcing elements either being parallel to one another or forming between them an angle of less than or equal to 5°, and the reinforcing elements of the bead layer are made of textile selected from the group consisting of: aliphatic polyamide, aromatic polyamide, a combination of aliphatic polyamide and aromatic polyamide, polyethylene terephthalate, and rayon.

17. The tire according to claim 1, wherein the carcass layer is a layer of reinforcing elements and the reinforcing elements of the carcass layer are made of metal or of textile selected from the group consisting of: aliphatic polyamide, aromatic polyamide, a combination of aliphatic polyamide and aromatic polyamide, polyethylene terephthalate, and rayon.

* * * * *